Figure 1:
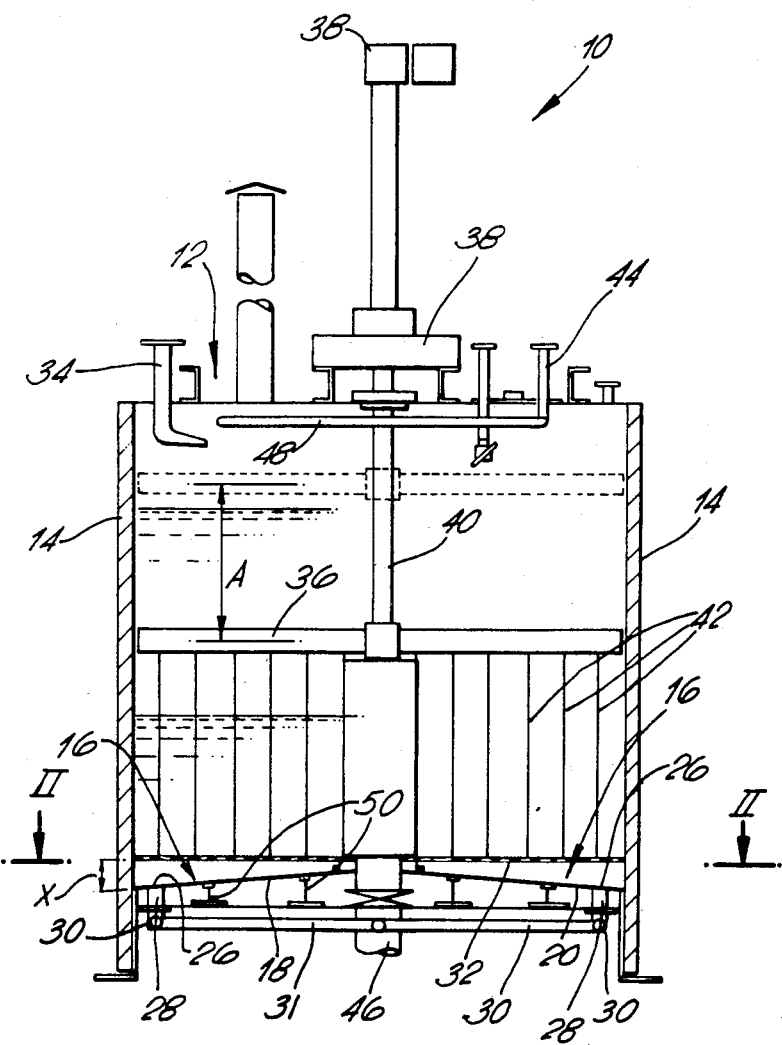

United States Patent [19]

Hancock

[11] Patent Number: 4,542,682

[45] Date of Patent: Sep. 24, 1985

[54] LAUTER TUNS

[75] Inventor: John C. Hancock, Willington, England

[73] Assignee: Robert Morton DG Limited, Staffordshire, England

[21] Appl. No.: 631,576

[22] Filed: Jul. 17, 1984

[30] Foreign Application Priority Data

Aug. 9, 1983 [GB] United Kingdom ............... 8321445

[51] Int. Cl.⁴ ............................................. C12H 1/00
[52] U.S. Cl. ................................... 99/277.1; 210/534; 426/29
[58] Field of Search .................. 99/277, 277.1, 277.2, 99/278, 276; 426/29, 16; 435/305, 306, 307, 308, 315, 311; 210/534, 535

[56] References Cited

U.S. PATENT DOCUMENTS

| 2,042,284 | 5/1936 | Westcott | 99/278 |
| 2,195,408 | 4/1940 | Downes | 210/534 |
| 2,758,030 | 8/1956 | Metz | 99/278 |
| 3,034,895 | 5/1962 | O'Malley | 99/278 |
| 3,380,373 | 4/1968 | Lenz | 99/278 |
| 4,351,231 | 9/1982 | Wolfseder | 99/277.2 |
| 4,361,080 | 11/1982 | Smith | 99/277.1 |

Primary Examiner—Robert W. Jenkins
Attorney, Agent, or Firm—Wood, Herron & Evans

[57] ABSTRACT

A lauter tun (10,100) has a bottom (16) comprising two flat plates (18,20) joined together on a straight line (see 22), each plate (18,20) sloping downwardly from the center-line to the peripheral wall (14) of the tun, such that during flushing, water flows down each slope to flush solids towards two large collection points (26) located at the lowest point of the bottom 16.

8 Claims, 4 Drawing Figures

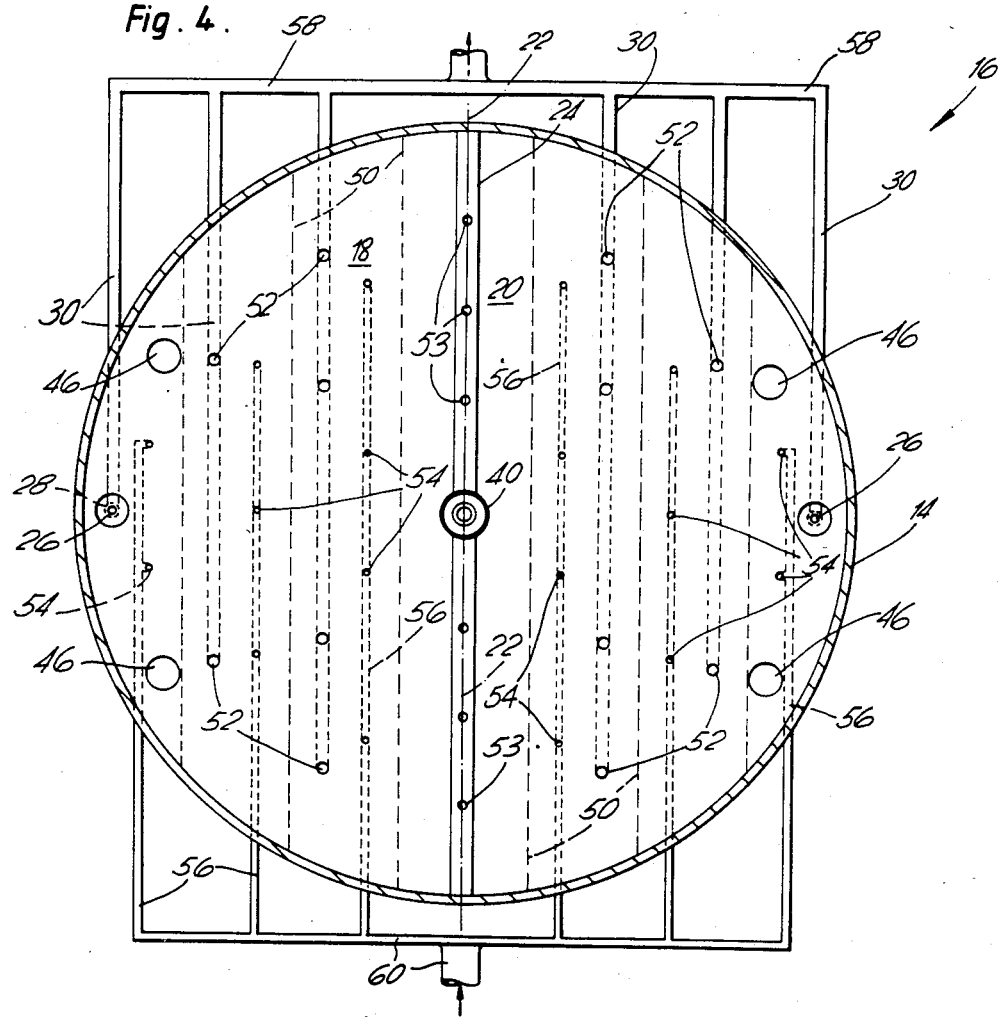

LAUTER TUNS

This invention relates to brewing apparatus and in particular to lauter tun bottoms.

Lauter tuns are used in the brewery to separate the sweet worts from a malted barley/adjuncts mash fed from a standard mash mixer. A filter bed is formed in the base of the tun and after knives have acted on the bed to keep the filter bed open, the worts run-off through the bed and through a filter plate on which the filter bed rests, into the bottom of the tun. In known tuns, the tun bottom has either a number of collection points in the form of holes through a flat bottom of the tun or, with a cone tundish arrangement, a single central sump acting as a collection point to which the wort is directed by the conical shape of the bottom of the tun or, a bottom wall formed with a series of straight, parallel, valleys extending across the tun from one side to the other.

When the whole of the bottom wall of the tun is flat, problems arise as it is inherently difficult to level a truly flat surface with the result that puddles tend to form and these puddles can be of caustic liquid used for cleaning, which clearly can very adversely affect the brewing process.

Thus having a central sump are relatively very expensive to manufacture and tend to collect an undesirably high volume of first worts.

It is an object of this invention to overcome or mitigate one or more of the above problems.

A lauter tun in accordance with the invention has a bottom comprising two flat plates joined together on a centre-line and each sloping downwardly from the centre-line to the peripheral wall of the tun.

Such arrangements are relatively cheap to manufacture and simple to flush clean.

Preferably a wort collection point is provided adjacent the lowest point of each plate. The arrangement is such that the number of wort collection points needed for the tun bottom is reduced compared with known tun bottom arrangements. This reduces the number of wort manifold connections and hence the possibility of manifold blockages.

Preferably the flat plates are inclined to each other between 2° to 12° and to the horizontal between 1° to 6°, while a filter plate is preferably mounted closely above the tun bottom. These features lead to an improvement in the hydraulic balance in the void under the filter plate, that is vortices are reduced, giving a higher flow rate through the filter bed and out from the wort collection points.

The maximum underplate flow area, and the location of the collection points at the region of maximum flow through the grain bed, i.e. towards the outer edges of the tun, help to give hydraulic balance between all points of the filter bed, so as to draw off wort evenly from all points and therefore achieve good extract recovery and clear worts.

Preferably the two flat plates are joined together along the centre-line of the tun bottom to form a central ridge on which is positioned flushing means in the form of headers used to clean the bottom and flush any solids deposited on the plates to collection points. The positioning of the flushing headers and the arrangement of the sloping bottom results in easier cleaning and the use of less flushing material and less flushing headers than in known arrangements.

It will also be noted that any tendency for the velocity of the flushing material to slow down due to friction is counteracted due to the reducing width of the flow path towards the outside of the tun bottom. The sloping bottom together with the curvature of the vessel side promotes drainage towards the two collection points located at the lowest point.

Preferably the tun bottom is supported by a series of straight support members running parallel to the centre-line.

The wort collection points may be joined to straight wort mains or manifolds which extend across the tun parallel to the centre-line. The wort collection points preferably comprise an outlet hole connected to a sump, the sump walls being flared. The use of straight manifolds (or mains) means that any blockages that occur may be easily removed by for example rodding.

In large diameter tun bottoms, further but smaller collection points may be provided on the planar sloping surface of the plates to supplement the two large outlets at the edge of the edge of the tun bottom.

Figure 2:
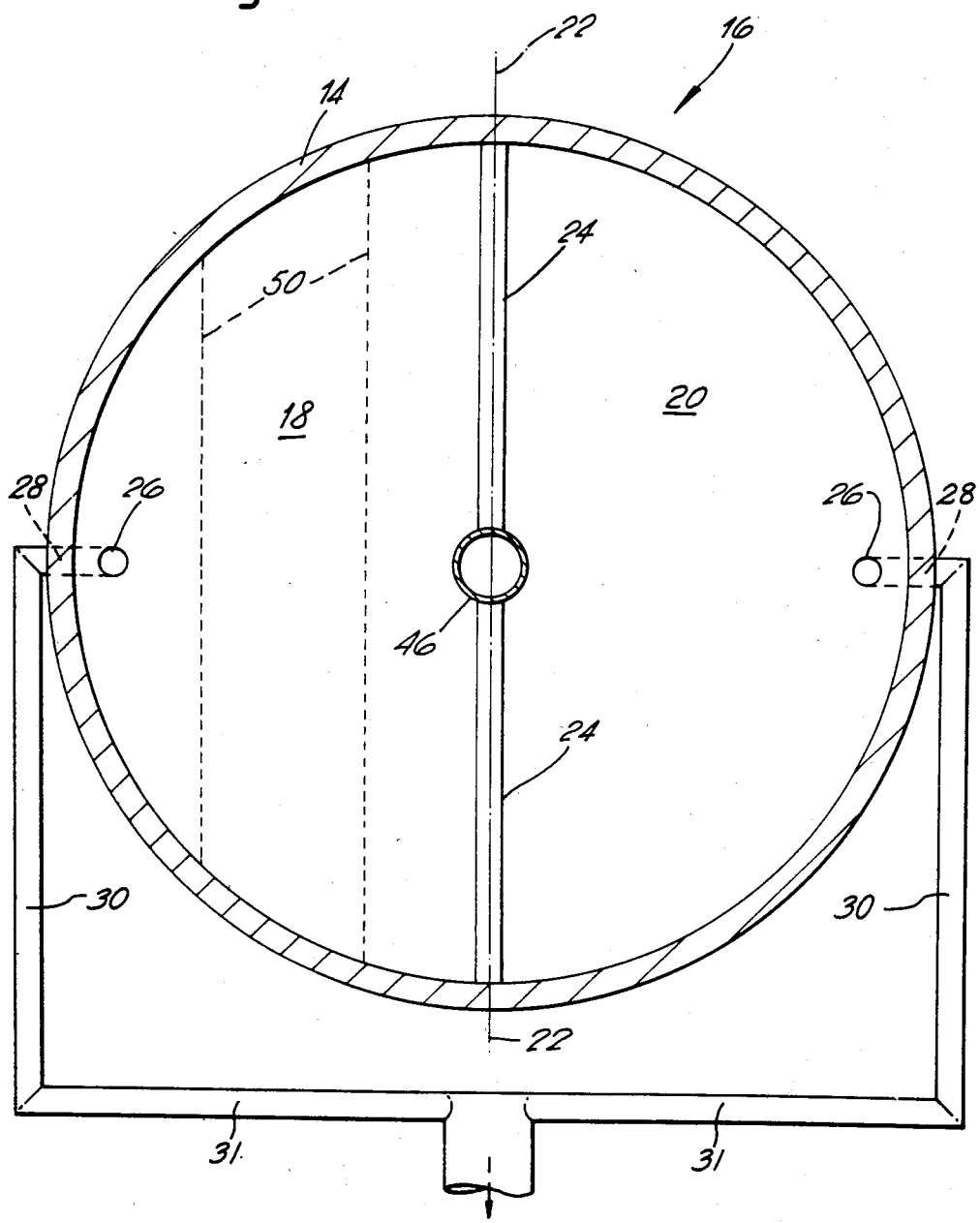
Figure 3:
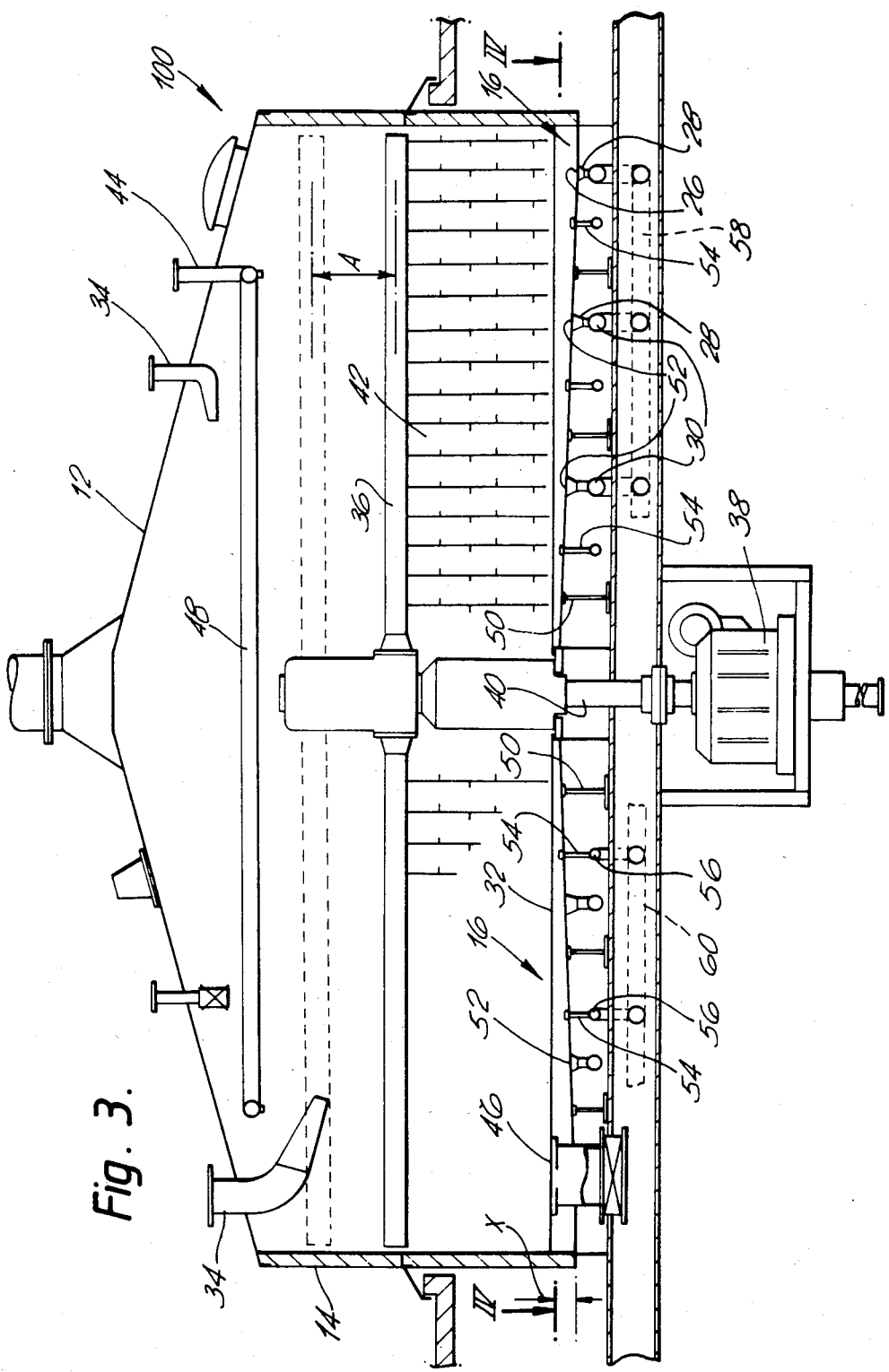

The invention will now be described, by way of example, with reference to the accompanying drawings, in which:

FIG. 1 is a side cross-section view of one embodiment of lauter tun bottom and lauter tun in accordance with the invention, FIG. 2 is a plan view taken along line II—II of the embodiment of FIG. 1, FIG. 3 is a side cross-section view of another embodiment of lauter tun bottom and lauter tun in accordance with the invention, and FIG. 4 is a plan view taken along line IV—IV of the embodiment of FIG. 3.

The two tuns 10 and 100 shown in the drawings are both circular, the similar parts of which will be described with reference to the same reference numerals.

Each is formed with an upper wall generally indicated at 12, a circumferential side wall having a cylindrical straight vertical side 14 and a bottom wall or tun bottom 16.

The tun bottom 16 is formed from two flat planar plates 18 and 20 joined together along a centre-line 22 of the bottom to form a central ridge 24. The plates 18 and 20 are inclined to each other at an angle of between 2° to 12° and to the horizontal at an angle of between 1° to 6°. The plates extend downwardly from the ridge to the bottom of the peripheral wall 14.

At least two wort collection points 26 are provided for the tun bottom 16, one collection point 26 for each plate being positioned adjacent the lowest point thereof. Each point 26 is connected by pipework 28 with a straight worts main or manifold 30 which extends beside the tun and beneath the bottom 16 parallel to the centre-line 22. The manifolds 30 are then connected to a common outlet pipe 31.

A filter plate 32 is positioned closely above the tun bottom 16 so as to reduce, as much as possible, the void or space beneath the filter plate 32. The possibility of vortices forming and unbalancing the hydraulic gradient at the filter plate 32 and wort collection points 26 interface, is minimised by using flared entrance connections into the pipework 28 (see in particular FIG. 4).

The operation of the lauter tuns 10 and 100 as is conventional is as follows:

Firstly the tun is underlet, the underlet liquor (usually water) entering the tun body through the manifold 30 and collection points 26 to a level of about 25 mm above the filter plate 32.

Mash from a standard mash mixer (not shown) is then introduced into the top portion of the tun through inlets 34 passing through the upper wall 12. This mash is prevented from being driven into the apertures in the filter plate 32 due to the cushioning effect of the underlet liquor previously introduced.

A carriage 36 rotated by means of a drive motor 38 driving a shaft 40, carries a number of knives 42 which act to cut into the mash to keep the bed open and also act to spread and level the mash over the filter plate 32. Once the bed is formed, the carriage 36 is raised (see arrow A) to the position shown in dash lines in FIGS. 1 and 3 and stops rotating.

The liquid and any solids present beneath the slotted filter plate 32 are run off through the connection points 26 in the bottom of the tun and recirculated to the top of the mash bed through inlets 34, until a filter bed of malt husks is formed above the filter plate 32 and clear worts are obtained.

Due to the small void beneath the filter plate 32, this recirculation occurs relatively rapidly.

The high gravity clear worts are then run off from the tun through the collection points 26 for collection in a wort grant (not shown) until the liquid level is just above the top of the grain bed.

Water is then sparged through inlets 44 on to the grain bed to leach the remaining sugars from the grains, and the lauter knives 42 may be used to assist the process of leaching and filtration by opening up the grain bed.

After completion of each wort run off, the spent grain bed is drained, and then discharged through grain ports 46 using the lauter knives 42 (In this regard see G.B. Pat. No. 2059789), and the tun body flushed clean by passing flush liquid through spray heads 48.

The underfilter plate space and the lauter tun bottom 16 are also flushed clean of any solids which may have been deposited.

In the tun 100, the tun bottom 16 is additionally flushed in contrast to known arrangements by a flushing header 53 which runs along the central ridge 24 of the bottom 16.

Due to the tun bottom 16 in the tuns 10 and 100 comprising two sloping planar plates 18 and 20 and the curvature of the vessel side wall 14, flushing water flows down the slope on either side of the ridge 24, flushing solids towards the two large collection points 26 located at the lowest point of the bottom 16 on either side of the ridge 24.

Advantageously such flushing header and sloping bottom arrangements results in the use of less flushing headers and flushing liquid, and easier cleaning in general.

The tun bottom 16 is supported by support members 50 (e.g. I section girders), the members 50 extending across the bottom 16 parallel to the centre-line 22.

For small diameter tuns, for example as shown in FIG. 1, only two collection points 26 are required. For large diameter tuns, for example as shown in FIG. 3, additional but small collection points/outlets 52 may be provided in the sloping plates 18 and 20 to supplement the two larger collection points 26 at the lowest points of the bottom 16. These outlets 52 are connected to the wort manifolds 30 which are straight and extend across the bottom 16 parallel to the centre-line 22, the manifolds 30 themselves being connected to a common outlet pipe 58.

Furthermore for large diameter tuns additional flushing headers 54 may be provided on the sloping plates 18 and 20 to supplement the flushing header 53 on the central ridge 24. These headers 54 are connected to flushing manifolds 56 which are also straight and extend across the bottom 16 parallel to the centre-line 22, the manifolds 56 being connected to a common inlet pipe 60.

Preferably for either small or large diameter tun bottoms, the vertical drop (distance) between the central ridge 24 and the lowest point on the outer edge of the planar plates 18 and 20 (see x in FIGS. 1 and 3) is between 50 and 200 mm, preferably between 90 and 120 mm and even more preferably 106 mm.

I claim:

1. A lauter tun comprising
a circumferential side wall,
a bottom wall connected to said side wall, said bottom wall comprising two flat plates connected together at a ridge, each of said flat plates sloping downwardly from said ridge to said side wall, and each of said flat plates presenting a lowest point for that portion of said bottom wall defined by said plate with that lowest point being positioned at the inside periphery of said side wall, and
a wort collection outlet connected with each of said flat plates, each outlet being connected with its respective flat plate adjacent the lowest point defined by that flat plate at the inside periphery of said side wall.

2. A lauter tun as set forth in claim 1, said two plates being connected to each other at an angle of between about 2° and 12°.

3. A lauter tun as set forth in claim 1, each of said plates being inclined to the horizontal at an angle of between about 1° and 6°.

4. A lauter tun as set forth in claim 1, said tun comprising
a filter plate connected to said tun, said filter plate being positioned closely above said bottom wall.

5. A lauter tun as set forth in claim 1, said side wall being cylindrical, and said two plates being joined together to provide a linear ridge that is diametrically positioned relative to said cylindrical side wall.

6. A lauter tun as set forth in claim 5, said tun comprising
flushing means to clean said bottom wall, said flushing means being positioned generally parallel to said ridge formed by said two flat plates.

7. A lauter tun as set forth in claim 1, said tun comprising
a series of straight support members for supporting said bottom wall, said support members extending generally parallel to said ridge.

8. A lauter tun as set forth in claim 1, said tun comprising
a straight wort manifold which extends beneath said bottom wall generally parallel to said ridge.

* * * * *